No. 662,159. Patented Nov. 20, 1900.
F. WILCOMB.
DRIVING MEANS FOR KNITTING OR LIKE MACHINES.
(Application filed Aug. 4, 1900.)
(No Model.)
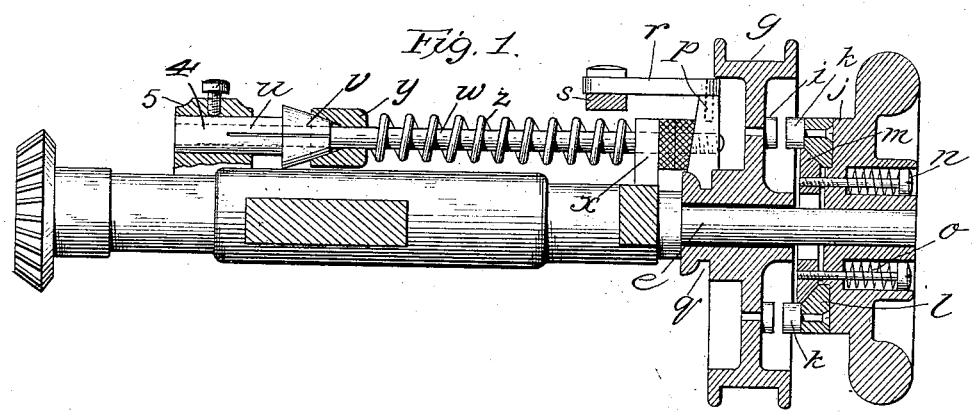
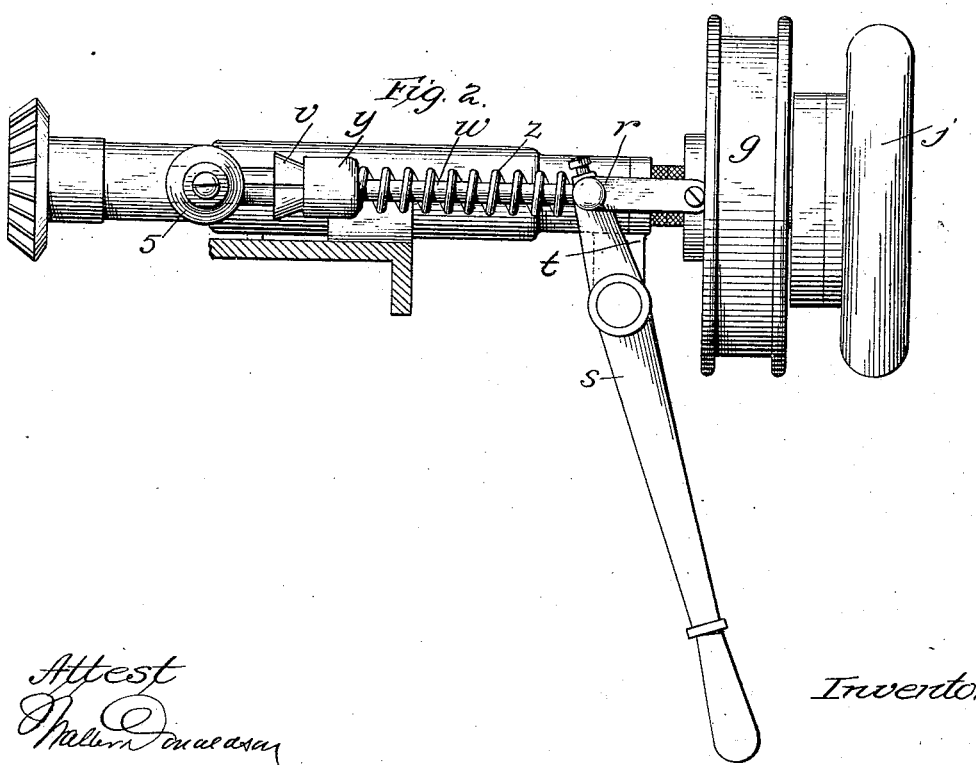
Inventor
FRANK WILCOMB
by Ellis Spear
Atty.

United States Patent Office.

FRANK WILCOMB, OF NORRISTOWN, PENNSYLVANIA.

DRIVING MEANS FOR KNITTING OR LIKE MACHINES.

SPECIFICATION forming part of Letters Patent No. 662,159, dated November 20, 1900.

Application filed August 4, 1900. Serial No. 25,915. (No model.)

*To all whom it may concern:*

Be it known that I, FRANK WILCOMB, a citizen of the United States, residing at Norristown, Pennsylvania, have invented certain new and useful Improvements in Driving Means for Knitting or Like Machines, of which the following is a specification.

My invention relates to driving mechanism for knitting and like machines; and my object is to provide such an arrangement of parts which will permit the driving-pulley to be belted from any desired direction.

My invention also includes, in combination with a pulley which may be shifted along the shaft to be driven, a clutch and friction-gear connection between the same and the shaft, said friction-gear being adjustable through readily-accessible means to transmit more or less of the power of the driving-pulley to the shaft to be driven.

My invention includes features of arrangement and adjustment hereinafter described, and particularly pointed out in the claims.

In the drawings, Figure 1 is a side view, partly in section, and Fig. 2 a plan view, of my invention.

The driving-shaft of the machine is shown at $e$, and this is rotated through a pulley $g$, arranged loosely thereon and adapted to be slid longitudinally thereof to make its pins $i$ engage or disengage the pins of a clutch-wheel $j$. This clutch-wheel has its pins $k$ carried by a ring $l$, loosely connected with the wheel and having an inclined bearing-face engaging a similar face of a ring $m$, which is carried by screws $n$, passing through sockets in the clutch-wheel, said sockets containing springs $o$, bearing upon the heads of the screws and tending to force the screws so as to press the rim $m$ into frictional contact with the ring $l$. This frictional pressure is adjustable. The screws $n$ are accessible for adjustment at the faces of the clutch-wheel. This clutch wheel or block is in the form of a hand-wheel. By adjusting the screws the friction-ring $l$ can be engaged more or less firmly with the clutch wheel or block, and thus more or less of its rotary motion imparted to it through the clutch-pins $i$ $k$ will be transmitted to the clutch block or wheel $j$; and consequently to the main driving-shaft, to which the clutch-block is fixed. The belt wheel or pulley $g$ is shifted longitudinally through an arm $p$, engaging a groove $q$ in a hub of the pulley, said arm being operated through a link $r$, connected with the shipper-lever $s$, pivoted to a boss $t$ on the bearing of the main driving-shaft. For holding the pulley either in or out I employ a friction device to place the shipper connection under restraint, and this device comprises a friction-clutch $u$, composed of a number of jaws forming a conical-shaped head $v$ and arranged upon a rod $w$, connected with the shipper-arm $p$, before described. This rod passes through a stud $x$, formed on the bearing of the shaft $e$. The conical head of the friction-device fits into a socket of a corresponding shaft formed in a block $y$, loose on the rod $w$, said block being pressed against the friction device to close the jaws thereof upon the rod by a spring $z$, surrounding the rod and bearing at its ends upon the stud $x$ and block $y$, respectively. The friction device $u$ has a stem 4 fitting into a support or stud 5, wherein it is held against longitudinal movement by a set-screw 6. The spring-pressed block $y$ will be forced upon the conical head $v$ of the block, and thus cause the jaws thereof to grip the rod $w$ with sufficient friction to hold said rod in either position to which it may be moved through the operation of the shipper-lever, and the arm $p$ and the driving-pulley will be held by this friction device either in or out of engagement with the clutch parts of the clutch-wheel $j$. This pressure of the block $y$ upon the conical head of the friction device, to make the same exercise frictional restraint on the rod $w$, is derived from the spring $z$, which constantly compresses the clutch-block $y$ upon the conical head. This device will automatically compensate for wear of the rod $w$ and friction-jaws, as the spring will compensate for wear on these parts and maintain them in frictional contact of the desired degree of pressure.

By my arrangement of the clutch parts outside of the bearing of the shaft and beyond the point at which the shipper connections are located I am enabled to connect with the driving-belt running to any point about the shaft, as the space about the pulley is left free for the belt to extend in any direction from the shaft. The hand-wheel being located outside of the belt-pulley is readily accessible for manipulation by the attendant. It will be noticed also that no shipper-fork or fast and loose pulley is necessary in my arrangement; but I employ instead the shifting pulley and the clutch parts.

I claim as my invention—

1. In combination, in a clutch, the clutch wheel or block fixed to the shaft, the loose clutch part, the friction members carried by the fixed clutch-block one of which members may have rotary movement independent of the clutch-block, and the engaging parts on said loose friction member and on the loose clutch part, substantially as described.

2. A clutch comprising a shaft, a fixed and a loose part thereon, and the two friction members between them for communicating the movement of one to the other of said parts with means for adjusting the pressure between the friction members, substantially as described.

3. A driving mechanism consisting of a shaft, a bearing therefor, a loose pulley adjacent to the bearing and outside thereof and having clutch parts and a hand-wheel attached rigidly to the end of the shaft and adjustable frictional connections between the loose pulley and fixed hand-wheel, said frictional connection including clutch parts, substantially as described.

4. In combination, the shaft, a loosely-mounted pulley and a fixed hand-wheel on the said shaft, and a frictional ring interposed between the pulley and hand-wheel having adjustable means, accessible from the outer end of the driving-shaft, said adjustable means passing through the hand-wheel, substantially as described.

5. A driving device consisting of the shaft, a pulley loosely mounted on the shaft, the hand-wheel fixed to the shaft, frictional connections between the two and a shipping device to move the pulley longitudinally on the shaft into and out of engagement with the friction connection, substantially as described.

6. A clutch comprising a clutch-block, a friction-ring carried thereby to rotate constantly in unison therewith, a ring carried loosely by the block and adapted to impart movement thereto, means for adjusting the pressure between the rings and a clutch part to engage the loose ring, substantially as described.

7. In combination, the clutch-block, a ring carried thereby to rotate in unison therewith, a loose friction-ring between the first ring and the clutch-block, a clutch part having means for engaging the loose ring and the screws for adjusting the first ring extending longitudinally of the shaft and accessible at the face of the clutch-block.

8. In combination, the shaft, the clutch members, a fixed and loose friction-ring carried by one of the members to communicate the motion from one member to the other through parts on the loose ring engaging parts on the opposite member, substantially as described.

9. In combination, a wheel or block, an adjustable friction member carried thereby to rotate in unison therewith a loose friction member engaging said adjustable member and carried by the wheel or block and a part to coact with the said loose member, substantially as described.

10. A clutch comprising the fixed and loose parts, a loose friction member to transmit movement from one to the other, means for regulating the pressure between said friction member and an opposing friction-surface on one of the parts and engaging parts between the said loose friction member and the other part of the clutch, substantially as described.

In testimony whereof I affix my signature in presence of two witnesses.

FRANK WILCOMB.

Witnesses:
F. B. WILDMAN,
OLGA M. RAKERD.